(12) United States Patent
Kira

(10) Patent No.: US 7,319,569 B2
(45) Date of Patent: *Jan. 15, 2008

(54) SERVO WRITER

(75) Inventor: Tadashi Kira, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 11/230,728

(22) Filed: Sep. 21, 2005

(65) Prior Publication Data

US 2006/0012911 A1 Jan. 19, 2006

Related U.S. Application Data

(62) Division of application No. 10/935,186, filed on Sep. 8, 2004.

(30) Foreign Application Priority Data

Sep. 9, 2003 (JP) ............... 2003-316138

(51) Int. Cl.
- *G11B 21/02* (2006.01)
- *G11B 5/09* (2006.01)
- *G11B 5/02* (2006.01)
- *G11B 5/584* (2006.01)
- *G11B 5/03* (2006.01)

(52) U.S. Cl. ............... 360/75; 360/48; 360/77.12; 360/57; 360/66

(58) Field of Classification Search ............... None
See application file for complete search history.

(56) References Cited

U.S. PATENT DOCUMENTS

| | | | | |
|---|---|---|---|---|
| 3,417,938 A * | 12/1968 | Markakis et al. | ........ | 242/338.4 |
| 4,287,540 A * | 9/1981 | Cheatham et al. | ........ | 360/18 |
| 4,996,609 A * | 2/1991 | Joannou | ........ | 360/57 |
| 5,053,893 A * | 10/1991 | Hayata et al. | ........ | 360/66 |
| 5,253,135 A * | 10/1993 | Hamana | ........ | 360/130.21 |
| 5,638,238 A * | 6/1997 | Kubota et al. | ........ | 360/130.21 |
| 5,689,384 A | 11/1997 | Albrecht et al. | | |
| 6,347,016 B1 | 2/2002 | Ishida et al. | | |
| 6,351,340 B2 * | 2/2002 | Dixon | ........ | 360/66 |
| 6,970,312 B2 | 11/2005 | Yip et al. | | |
| 7,142,388 B2 * | 11/2006 | Tateishi et al. | ........ | 360/77.12 |
| 2004/0120061 A1 * | 6/2004 | Yip et al. | ........ | 360/48 |
| 2005/0168869 A1 * | 8/2005 | Dugas et al. | ........ | 360/118 |

FOREIGN PATENT DOCUMENTS

JP 8-30942 2/1996

* cited by examiner

*Primary Examiner*—Andrew L. Sniezek
(74) *Attorney, Agent, or Firm*—Sughrue Mion, PLLC

(57) ABSTRACT

A servo writer is provided, which applies DC magnetization to a zone of a magnetic tape that is in advance subjected to AC erasing and writes a servo signal onto the DC magnetized zone. The servo writer has a DC erasing head and a servo signal writing head. The DC erasing head conducts DC erasing by applying DC magnetization to the magnetic tape which travels past the DC erasing head. The servo signal writing head writes the servo signal onto the magnetic tape downstream relative to the DC erasing head in a direction of traveling of the magnetic tape. In this servo writer, one of the DC erasing head and the servo signal writing head has an integrally formed flange which is able to restrict widthwise misalignment of the magnetic tape.

9 Claims, 5 Drawing Sheets

SERVO WRITER

This is a divisional of application Ser. No. 10/935,186 filed Sep. 8, 2004. The entire disclosure of the prior application, application Ser. No. 10/935,186 is hereby incorporated by reference.

BACKGROUND OF THE INVENTION

An apparatus consistent with the present invention relates to a servo writer which writes a servo signal onto a magnetic tape.

In recent years development of a magnetic tape has been progressing aiming at an increase in the density of data stored on it. Some magnetic tapes for backing up a computer have a storage capacity of on the order of 100 GB, which have several hundreds of data tracks on them in their widthwise direction. The width of a track has increasingly been getting smaller, so has a gap between the neighboring data tracks, accordingly. Under the circumstances, a servo control is typically selected, so that the record/reproduction element of a magnetic head can trace the data tracks. The servo control is able to align the position of the magnetic head (widthwise position of a magnetic tape) with a servo signal that is written onto the magnetic tape in advance while the magnetic head is reading it. Japanese Published Patent Application 8-30942 discloses related arts.

The servo signal described above is recorded onto a servo band free from magnetization of the magnetic tape by applying a record current so that magnetization is carried out in one direction. As shown in FIG. 5, a conventional servo signal SS is generated by supplying a recording pulse current PC consisting of a zero current and a plus pulse current to a servo band SB free from magnetization in order to avoid saturation of a servo signal readout element (MR element).

When the recording pulse current PC falls in a zero current, no area except for a servo pattern SP is magnetized, as shown in FIG. 5. When the recording pulse current PC falls in a plus current, the servo pattern SP is magnetized in one direction by leak magnetic flux coming from a servo gap. As a result, the servo signal SS is written onto a magnetic tape MT. A record and reproduction unit, which detects a turning point of magnetization for the servo signal SS with the servo signal readout element in the form of a change in electric resistance, generates a differential wave form (voltage) as a readout signal. Accordingly, the larger is the change in electric resistance of the servo signal readout element, the larger is a peak voltage of the readout signal for the servo signal SS. This leads to an increase in an SN ratio for the readout signal.

As shown in FIG. 5, when the servo signal SS remarkably changes or a range of readout is augmented as a result of introducing a servo signal readout element having large width, a peak voltage of a readout signal RSL for the servo signal SS increases, accordingly.

The trends in developing magnetic tapes involve high density recording up to the order of some tens tetra bytes. This will dictates an increase in the number of data tracks, which inevitably requires that the width of a data track and the gap between neighboring data tracks be much narrower, as well as a decrease in the thickness of a magnetic tape. In this connection, a detectable amount of magnetism in reading the servo signal SS will decrease, and a change in an amount of magnetization of the servo signal SS detected by the servo signal readout element will decrease, accordingly.

In this way, an SN ratio of a readout signal RSS of the servo signal SS deteriorates because its peak voltage decreases as shown in FIG. 5. As a result, because it is not possible for a record and reproduction unit for a magnetic tape to accurately read out the servo signal SS, it is not possible to implement accurate positioning control for a magnetic head.

An applicant of the present invention filed a Japanese Patent Application (Japanese Unpublished Patent Application 2003-110396) disclosing a an invention, in which a servo signal is written onto a servo band while the signal is magnetized in an opposite direction as either one of longitudinal directions for magnetization of the servo band relative to a magnetic tape. In this way, the invention achieves a greater change rate and a change of magnetic field in reading the servo signal by a servo signal readout element.

Also, the applicant filed another Japanese Patent Application (Japanese Unpublished Patent Application 2003-116667). The document discloses a magnetic head complex (servo head write assembly) which has a DC erasing head and a servo signal writing head that are integrally formed. The DC erasing head applies magnetization to a servo band of a magnetic tape in either one of longitudinal directions relative to the magnetic tape. The servo signal writing head writes a servo signal onto the tape in an opposite direction as that of magnetization of the servo band.

The applicant has found that if there is widthwise misalignment between the magnetized zone and the servo signal, not only the servo signal does not work in the misaligned area, but also the DC magnetized zone will intrude a data band. When a data signal is recorded on to the DC magnetized zone, noise due to a DC component overlaps with the data signal.

SUMMARY OF THE INVENTION

The present invention seeks to provide a servo writer which is able to control misalignment to a minimum between a DC magnetized zone and a servo signal in the widthwise direction of a magnetic tape in order to prevent adverse DC magnetization for a data band.

It is an aspect of the present invention to provide a servo writer which applies DC magnetization to a zone of a magnetic tape that is in advance subjected to AC erasing and writes a servo signal onto the DC magnetized zone. The servo writer has a DC erasing head and a servo signal writing head. The DC erasing head conducts DC erasing by applying DC magnetization to the magnetic tape which travels past the DC erasing head. The servo signal writing head writes the servo signal onto the magnetic tape downstream relative to the DC erasing head in a direction of traveling of the magnetic tape. In this servo writer, one of the DC erasing head and the servo signal writing head has an integrally formed flange which is able to restrict widthwise misalignment of the magnetic tape.

The servo writer described above writes the servo signal onto the zone of the magnetic tape downstream, which is subjected to DC magnetization upstream, while the magnetic tape is controlled to be aligned with a magnetic head by its integrally formed flange. In this way, it is possible to prevent applying adverse DC magnetization to a write zone (AC erased zone) of the magnetic tape.

It is another aspect of the present invention to provide a servo writer, in which each of the DC erasing head and the servo signal writing head has the flange.

It is still another aspect of the present invention to provide a servo writer which applies AC erasing to a zone of a magnetic tape that is in advance subjected to DC magnetization and writes a servo signal onto the DC magnetized zone. The servo writer has an AC erasing head and a servo signal writing head. The AC erasing head conducts AC erasing by applying AC magnetization to the magnetic tape which travels past the AC erasing head. The servo signal writing head writes the servo signal onto the magnetic tape downstream relative to the AC erasing head in a direction of traveling of the magnetic tape. In this servo writer, one of the AC erasing head and the servo signal writing head has an integrally formed flange which is able to restrict widthwise misalignment of the magnetic tape.

Upstream applying AC magnetization (AC erasing) to the zone of the magnetic tape which is in advance subjected to DC magnetization, downstream writes the servo writer described above the servo signal onto the other zone which remains DC magnetized, while the magnetic tape is controlled to be aligned with a magnetic head by its integrally formed flange. In this way, it is possible to prevent applying adverse DC magnetization to a write zone (AC erased zone) of the magnetic tape.

It is yet another aspect of the present invention to provide a servo writer, in which each of the AC erasing head and the servo signal writing head has the flange.

Because the servo writer described above is able to control the misalignment between a DC magnetized zone and the servo signal in a widthwise direction of the magnetic tape to a minimum, it is possible to prevent applying adverse DC magnetization to a data band and thereby to ensure a data write zone. It is also possible to achieve a reduction in the number of parts and production costs compared with a flange which is structurally independent of a magnetic head. The reason for this is that the servo writer of the present invention has the flange which is integrally formed with its magnetic head having a magnetic gap.

DETAILED DESCRIPTION OF EXEMPLARY EMBODIMENTS OF THE INVENTION

Exemplary embodiments of a servo writer according to the present invention are now described with reference to the accompanying drawings.

a. First Embodiment

A first embodiment of the present invention relates to a servo writer which applies DC magnetization to a zone of a magnetic tape that is in advance subjected to AC erasing and writes a servo signal onto the DC magnetized zone.

Figure 1:
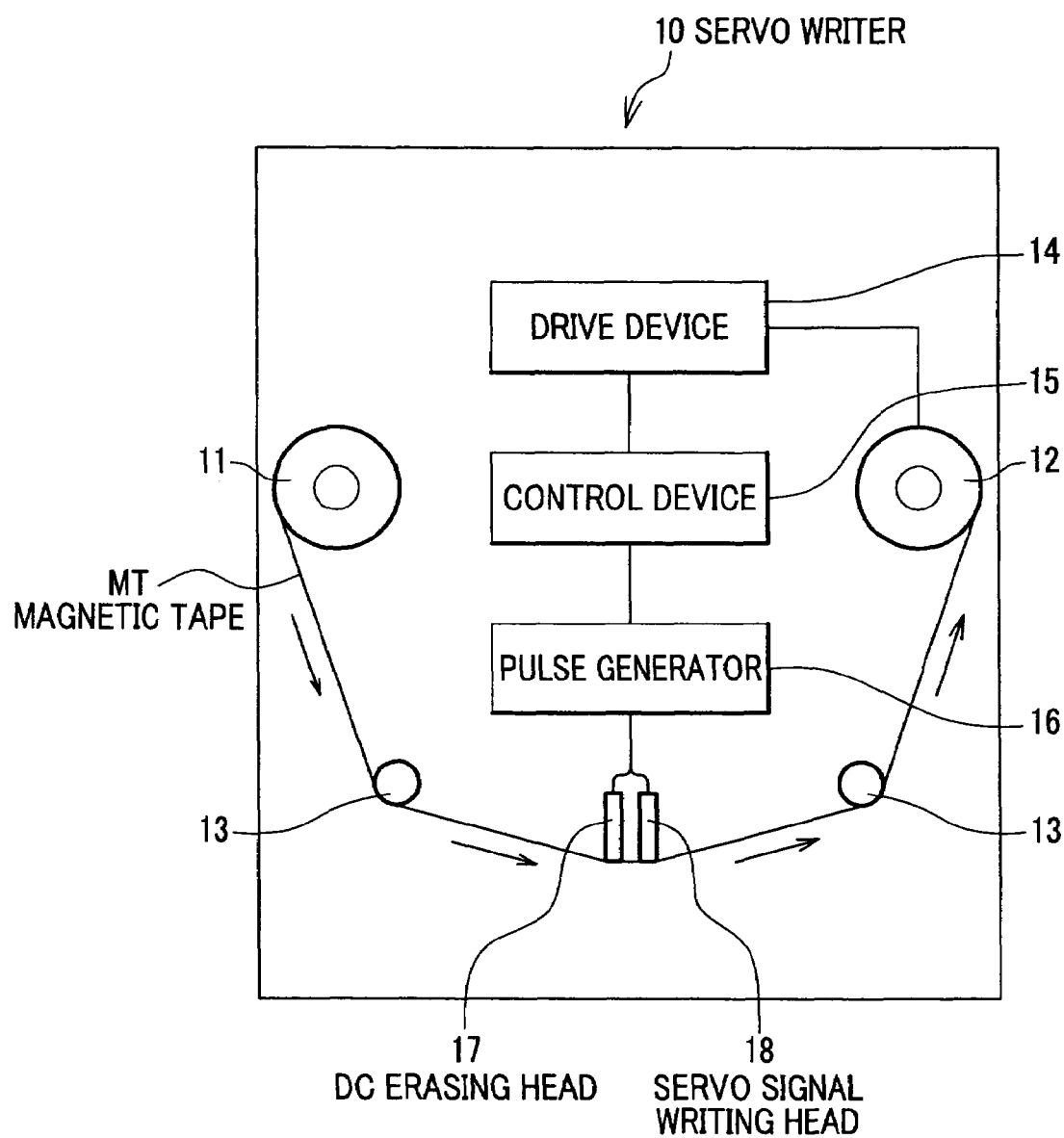
FIG. 1 is a schematic diagram illustrating a servo writer according to the present invention.
Figure 2:
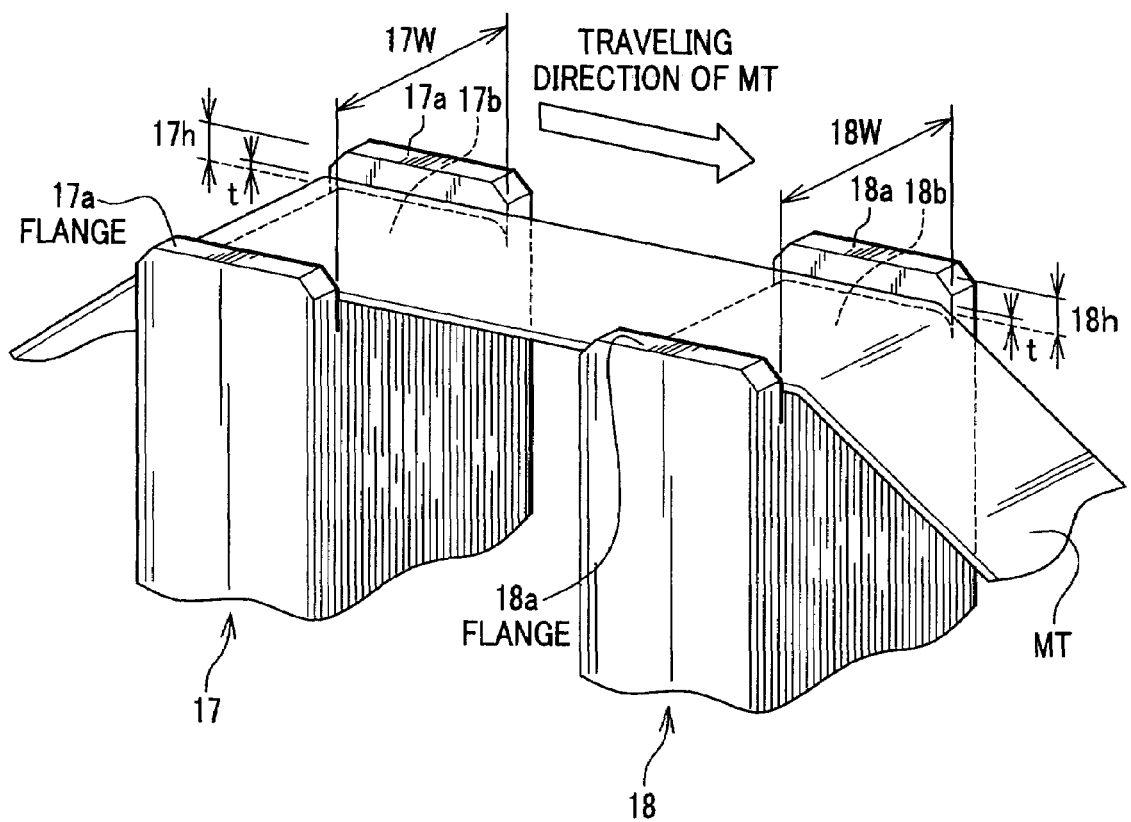
FIG. 2 is an enlarged perspective view showing a DC erasing head and a servo signal writing head belonging to the servo writer shown in FIG. 1

FIG. 1 is a schematic diagram illustrating a servo writer according to the first embodiment of the present invention. FIG. 2 is an enlarged perspective view showing a DC erasing head and a servo signal writing head belonging to the servo writer shown in FIG. 1 A DC erasing head 17 and a servo signal writing head 18 shown in FIG. 2 are viewed from the bottom of FIG. 1.

As shown in FIG. 1, a servo writer 10 has a feeding reel 11, a rewinding reel 12, tape guides 13, a drive device 14, a control device 15, a pulse generator 16, a DC erasing head 17 and a servo signal writing head 18.

The feeding reel 11, around which a magnetic tape MT before servo signal writing is wound, feeds the tape MT when a servo signal is written onto the tape MT. The tape MT fed by the feeding reel M travels to the DC erasing head 17 and the servo signal writing head 18, being guided by a first tape guide 13.

The DC erasing head 17 applies DC magnetization to the tape MT and the servo signal writing head 18 writes a servo signal onto it. Being guided by a second tape guide 13, the tape MT travels to the rewinding reel 12. The reel 12 rotationally driven by the drive device 15 rewinds the tape MT onto which the servo signal is written. In this connection, the control device 15 is responsible for diversely controlling the servo writer 10.

The pulse generator 16 supplies the DC erasing head 17 and the servo signal writing head 18 with a recording pulse current according to a pulse control signal from the control device 15.

As shown in FIG. 2, the DC erasing head 17 is disposed upstream next to the servo signal writing head 18, each of which has a magnetic gap (not shown).

The DC erasing head 17 is shaped substantially like a rectangular parallelepiped. A pair of flanges 17a is formed on both sides of a surface of the DC erasing head 17 which the magnetic tape MT travels past (an upper surface in FIG. 2). The flanges 17a, which are integrally formed with the DC erasing head 17, are able to restrict widthwise misalignment between the DC erasing head 17 and the tape MT. A height 17h of the flange 17 is adapted to be not less than a thickness of the tape MT, specifically speaking, approximately between 1 to 4 times. These values are selected in order to take precautionary measures. A minimum 1 is preferable to prevent the tape MT from getting over the flanges 17a, and a maximum 4 is preferable to avoid potential damage to it during replacement of the tape MT. When the tape MT belongs to a ½ inch system, a width 17w between inner walls of the flanges 17a is adapted to be from 12.64 to 12.66 mm. A surface 17b of the DC erasing head 17, which the tape MT travels past, makes a flat surface free from curvature. A magnetic gap (not shown) is formed on the surface 17b.

The flanges 17a can be ground with a grindstone whose thickness is adapted to be equal to the width 17w.

The Servo signal writing head 18 is shaped substantially like a rectangular parallelepiped. A pair of flanges 18a is formed on both sides of a surface of the servo signal writing head 18 which the magnetic tape MT travels past (an upper surface in FIG. 2). The flanges 18a, which are integrally formed with the servo signal writing head 18, are able to restrict widthwise misalignment between the servo signal writing head 18 and the tape MT. A height 18h of the flange 18 is adapted to be not less than a thickness of the tape MT, specifically speaking, approximately between 1 to 4 times. These values are selected in order to take precautionary measures. A minimum 1 is preferable to prevent the tape MT from getting over the flanges 18a, and a maximum 4 is preferable to avoid potential damage to it during replacement of the tape MT. When the tape MT belongs to a ½ inch system, a width 18w between inner walls of the flanges 18a is adapted to be from 12.64 to 12.66 mm. A surface 18b of the servo signal writing head 18, which the tape MT travels past, makes a flat surface free from curvature. A magnetic gap (not shown) is formed on the surface 18b.

The flanges 18a can be ground with a grindstone whose thickness is adapted to be equal to the width 18w.

The DC erasing head 17 and the servo signal writing head 18 are disposed next to each other. The surfaces 17b and 18b, which the magnetic tape MT travels past, are spatially disposed so that the former is relatively level with the latter in order to restrict widthwise misalignment of the tape MT.

It may be alternatively possible to adopt only a pair of flanges for one of the DC erasing head 17 and the servo signal writing head 18, as long as the misalignment between a DC magnetized zone and a section where a servo signal is written is controlled to fall in not more than 10 μm or preferably 5 μm. Also, it is not mandatory to place the pair of flanges on one of the magnetic heads, but it may instead be possible to place a first flange on an upstream magnetic head and a second flange on a downstream magnetic head on opposite sides.

Figure 3A:
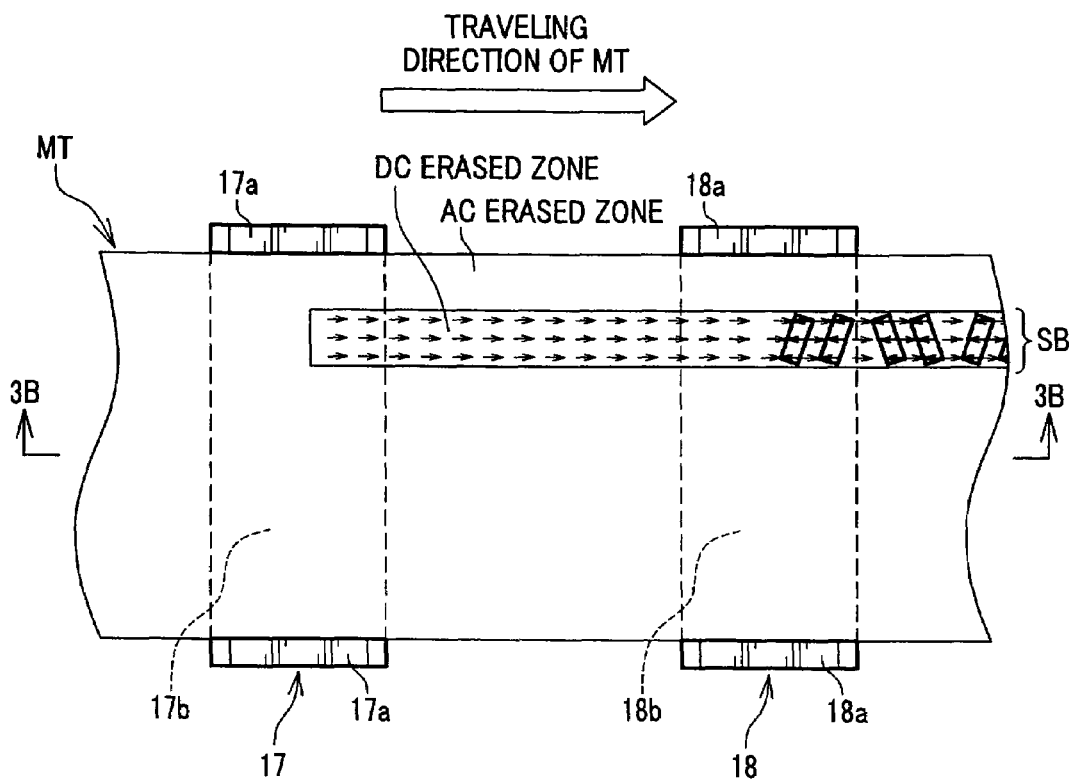
FIG. 3A is a plan view showing a magnetic tape according to the present invention.
Figure 3B:
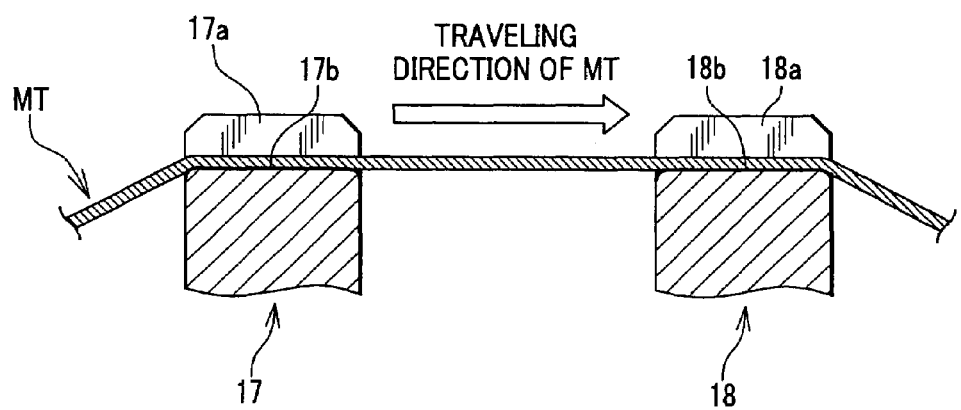
FIG. 3B is a sectional view taken along line 3B-3B as shown in FIG. 3A.

Description is now given to operation of the servo writer 10 described above when it writes a servo signal on to the magnetic tape MT with reference to FIGS. 3A and 3B. FIGS. 3A and 3B are schematic diagrams illustrating operation of the servo writer. FIG. 3A is a plan view showing a magnetic tape which is being written a servo signal. FIG. 3B is a sectional view taken along line 3B-3B as shown in FIG. 3A.

The magnetic tape MT which is in advance subjected to AC erasing and fed by the feeding reel 11 is carried to the DC erasing head 17 and the servo signal writing head 18 guided by the first tape guide 13 (see FIG. 1).

As shown in FIG. 3A, the magnetic tape MT travels past the surface 17b on which a magnetic gap (not shown) is formed. The tape MT, which is controlled by the pair of flanges 17a of the DC erasing head 17, travels past the surface 17b without misalignment in its widthwise direction. In parallel, a zone of the tape MT continuously DC magnetized like a belt.

Subsequently, the tape MT travels past the surface 18b on which a magnetic gap (not shown) is formed. The tape MT, which is controlled by the pair of flanges 18a of the servo signal writing head 18, travels past the surface 18b without misalignment in its widthwise direction. In parallel, the head 18 intermittently writes a servo signal overlapped on the DC magnetized zone at regular intervals, thereby generating a servo band SB.

The tape MT, onto which the servo signal writing head 18 writes the servo signal, is guided by the second tape guide 13 and rewound by the rewinding reel 12 (see FIG. 1).

The servo writer according to the first embodiment is able to prevent applying adverse DC magnetization to a data band of a magnetic tape, thereby ensuring a data writing zone, because the servo writer can control the misalignment in a widthwise direction of the magnetic tape. Because the flanges are integrally formed with the magnetic heads having magnetic gaps, it is possible not only to achieve a reduction in the number of parts and production costs but also to eliminate dimensional errors associated with assembly compared with separate type flanges.

b. Second Embodiment

A second embodiment of a servo writer according to the present invention is now described with reference to FIG. 4.

An apparatus consistent with the second embodiment relates to a servo writer which applies AC erasing to a zone of a magnetic tape that is in advance subjected to DC magnetization and writes a servo signal onto the DC magnetized zone. Description for components of the second embodiment would not be repeated, which are the same as those of the first embodiment, bearing the same symbols.

As shown in FIG. 4, an AC erasing head 19 is shaped substantially like a rectangular parallelepiped. A pair of flanges 19a is formed on both sides of a surface of the AC erasing head 19 which the magnetic tape MT travels past (an upper surface in FIG. 2). The flanges 19a, which are integrally formed with the AC erasing head 19, are able to restrict a widthwise misalignment between the AC erasing head 19 and the tape MT. A height 19h of the flange 19 is adapted to be not less than a thickness of the tape MT, specifically speaking, approximately between 1 to 4 times. These values are selected in order to take precautionary measures. A minimum 1 is preferable to prevent the tape MT from getting over the flanges 19a, and a maximum 4 is preferable to avoid potential damage to it during replacement of the tape MT. When the tape MT belongs to a ½ inch system, a width 19w between inner walls of the flanges 19a is adapted to be from 12.64 to 12.66 mm. A surface 19b of the AC erasing head 19, which the tape MT travels past, makes a flat surface free from curvature. A magnetic gap (not shown) is formed on the surface 19b.

The flanges 19a can be ground with a grindstone whose thickness is adapted to be equal to the width 19w. The AC erasing head 19 and the servo signal writing head 18 are disposed next to each other. The surfaces 19b and 18b, which the magnetic tape MT travels past, are spatially disposed so that the former is relatively level with the latter in order to restrict widthwise misalignment of the tape MT.

It may be alternatively possible to adopt only a pair of flanges for one of the AC erasing head 19 and the servo signal writing head 18, as long as the misalignment between an AC magnetized zone and a section where a servo signal is written is controlled to fall in not more than 10 μm or preferably 5 μm. Also, it is not mandatory to place the pair of flanges on one of the magnetic heads, but it may instead be possible to place a first flange on an upstream magnetic head and a second flange on a downstream magnetic head on opposite sides.

Figure 4A:
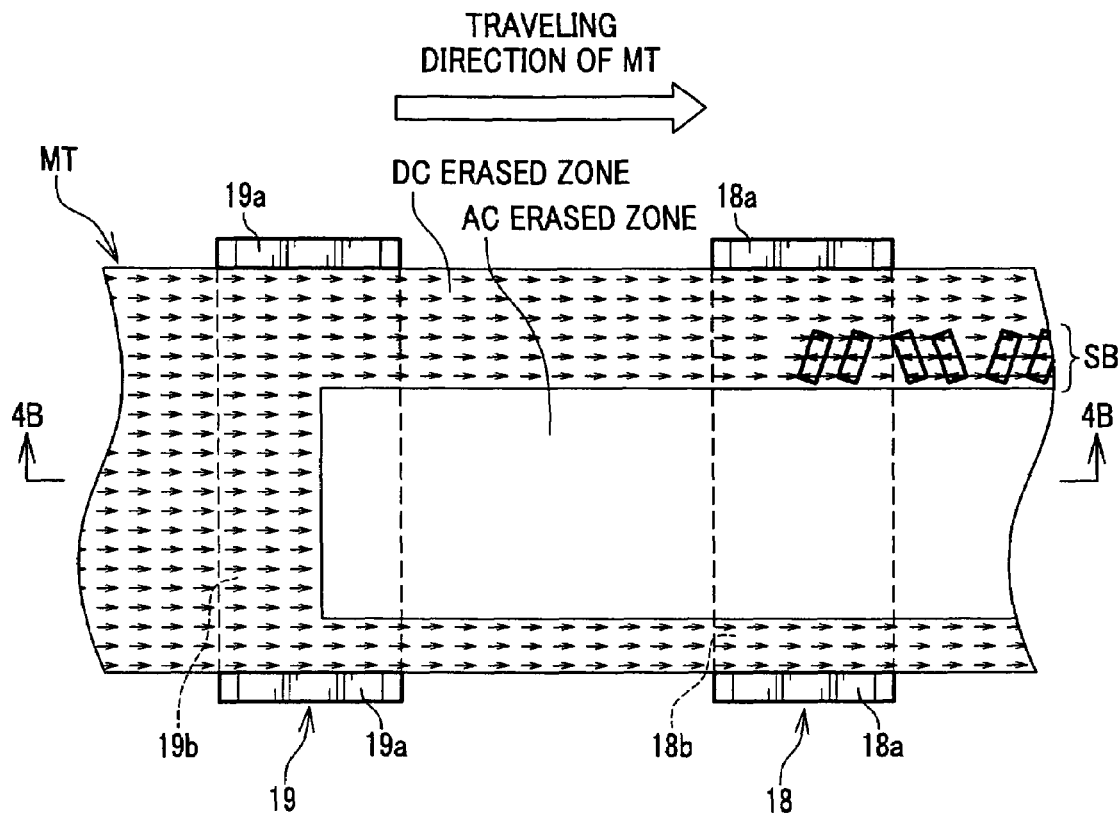
FIG. 4A is a plan view showing a magnetic tape according to the present invention.
Figure 4B:
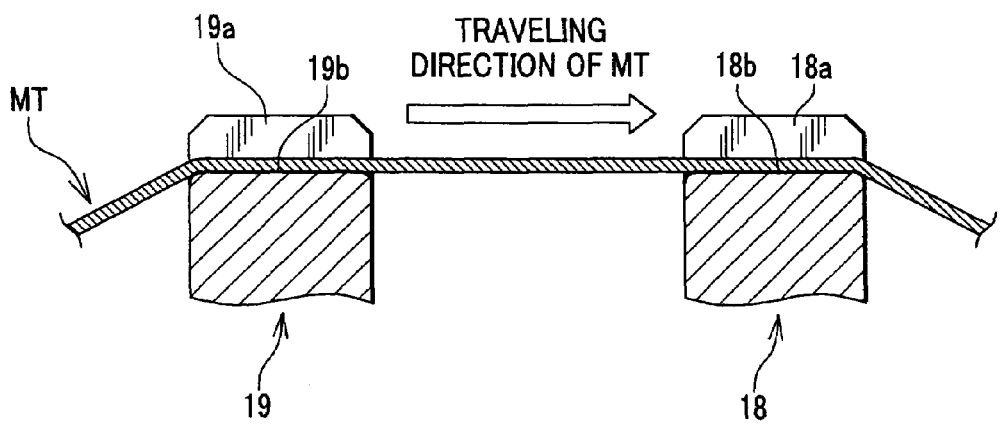
FIG. 4B is a sectional view taken along line 4B-4B as shown in FIG. 4A.
Figure 5:
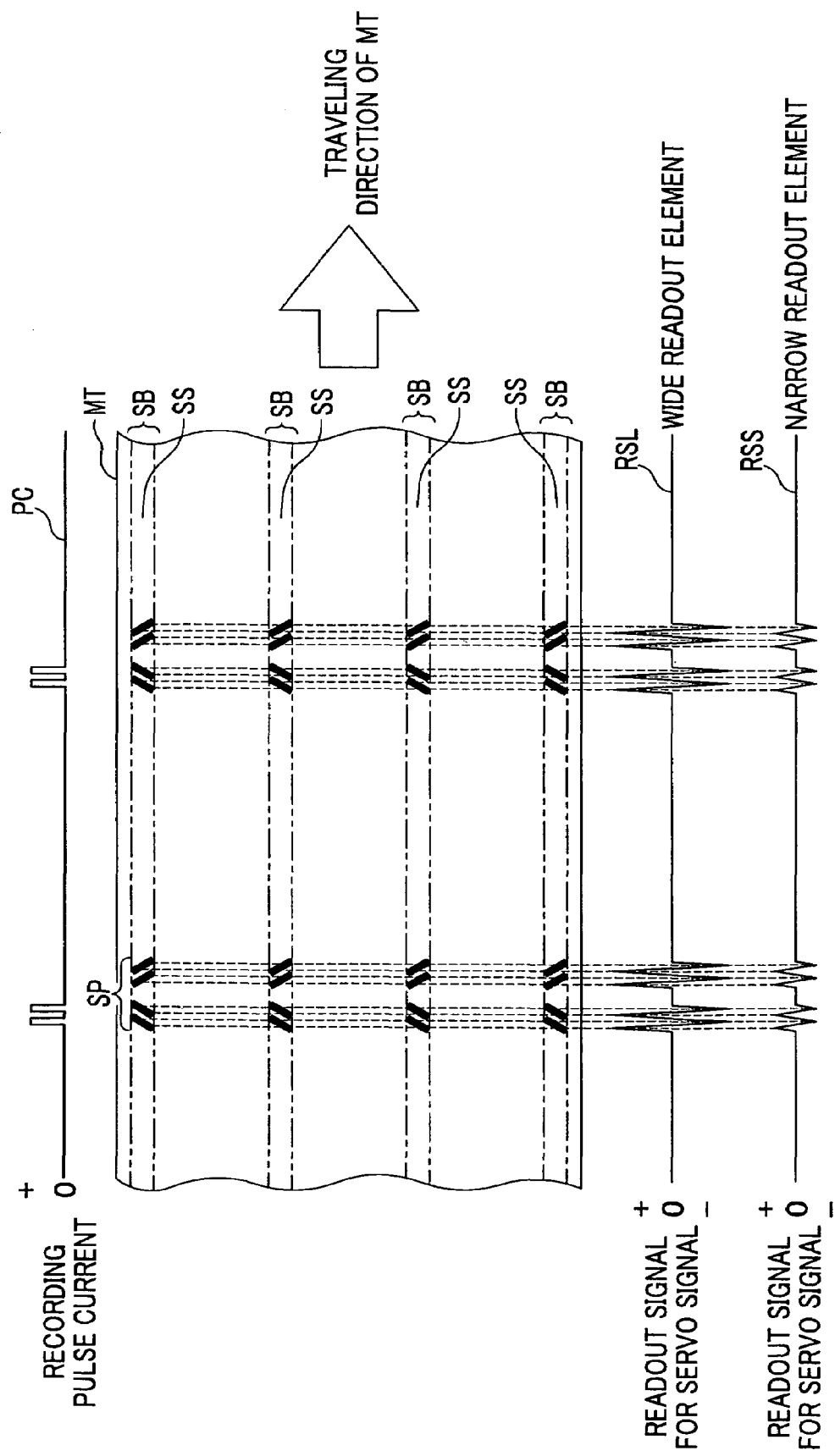
FIG. 5 is a schematic diagram illustrating a magnetic tape according to a prior art.

Description is given to operation of the servo writer 10 described above when it writes a servo signal on to the magnetic tape MT with reference to FIGS. 4A and 4B. FIGS. 4A and 4B are schematic diagrams illustrating operation of the servo writer. FIG. 4A is a plan view showing a magnetic tape which is being written a servo signal. FIG. 4B is a sectional view taken along line 4B-4B as shown in FIG. 4A.

The magnetic tape MT which is in advance subjected to DC magnetization and fed by the feeding reel 11 is carried to the AC erasing head 19 and the servo signal writing head 18 guided by the first tape guide 13 (see FIG. 1).

As shown in FIG. 4A, the magnetic tape MT travels past the surface 19b on which a magnetic gap (not shown) is formed. The tape MT, which is controlled by the pair of flanges 19a of the AC erasing head 19, travels past the surface 19b without misalignment in its widthwise direction. In parallel, a zone of the tape MT is continuously AC magnetized like a belt.

Subsequently, the tape MT travels past the surface 18b on which a magnetic gap (not shown) is formed. The tape MT, which is controlled by the pair of flanges 18a of the servo signal writing head 18, travels past the surface 18b without misalignment in its widthwise direction. In parallel, the head 18 intermittently writes a servo signal overlapped on the DC magnetized zone at regular intervals, thereby generating a servo band SB.

The tape MT, onto which the servo signal writing head 18 writes the servo signal, is guided by the second tape guide 13 and rewound by the rewinding reel 12 (see FIG. 1).

The servo writer according to the second embodiment is able to prevent applying adverse DC magnetization to a data band of a magnetic tape, thereby ensuring data writing zone, because the servo writer can control the misalignment in a widthwise direction of the magnetic tape. Because the flanges are integrally formed with the magnetic heads having magnetic gaps, it is possible not only to achieve a reduction in the number of parts and production costs but also to eliminate dimensional errors associated with assembly compared with separate type flanges.

Foreign priority document, JP 2003-316138, filed Sep. 9, 2003, is hereby incorporated by reference.

While the invention has been described in detail and with reference to exemplary embodiments thereof, it will be apparent to one skilled in the art that various changes and modifications can be made therein without departing from the spirit and scope thereof.

What is claimed is:

1. A servo writer which applies AC erasing to a zone of a magnetic tape that is in advance subjected to DC magnetization and writes a servo signal onto the DC magnetized zone, comprising:
    an AC erasing head for conducting AC erasing of a part of the DC magnetized tape by applying AC magnetization to the magnetic tape which travels past the AC erasing head; and
    a servo signal writing head for writing the servo signal onto the remaining DC magnetized zone of the magnetic tape downstream relative to the AC erasing head in a direction of traveling of the magnetic tape,
    wherein one of the AC erasing head and the servo signal writing head has an integrally formed flange which is able to restrict widthwise misalignment of the magnetic tape.

2. A servo writer according to claim 1, wherein each of the AC erasing head and the servo signal writing head has the flange.

3. A servo writer according to claim 2, wherein a surface of each of the AC erasing head and the servo signal writing head which the magnetic tape travels past is flat, and the flange is adapted to be of a shape of plate which thoroughly runs on both sides of the surface in the direction of traveling of the magnetic tape.

4. A servo writer according to claim 2, wherein a surface of each of the AC erasing head and the servo signal writing head which the magnetic tape travels past is flat, and the flange is adapted to be of a shape of plate which thoroughly runs on one side of the surface in the direction of traveling of the tape, wherein a flange for the AC erasing head and the other flange for the servo signal writing head are adapted to be opposite with each other.

5. A servo writer according to claim 1, wherein a surface of the AC erasing head which the magnetic tape travels past is flat, and the flange is adapted to be of a shape of plate which thoroughly runs on both sides of the surface in the direction of traveling of the magnetic tape.

6. A servo writer according to claim 5, wherein the surface of the erasing head is substantially parallel to the direction of traveling of the magnetic tape.

7. A servo writer according to claim 1, wherein a surface of the servo signal writing head which the magnetic tape travels past is flat, and the flange is adapted to be of a shape of plate which thoroughly runs on both sides of the surface in the direction of traveling of the magnetic tape.

8. A servo writer according to claim 1, wherein a height of the flange is adapted to be 1 to 4 times as large as a thickness of the magnetic tape.

9. A servo writer according to claim 1, wherein the servo signal writing head records the servo signal by oppositely magnetizing the DC magnetized zone.

* * * * *